United States Patent [19]

Endzweig

[11] 3,982,841

[45] Sept. 28, 1976

[54] CONNECTING APPARATUS FOR FRAME MEMBERS

[76] Inventor: Abraham Endzweig, 2822 Clement St., San Francisco, Calif. 94121

[22] Filed: Dec. 8, 1975

[21] Appl. No.: 638,395

[52] U.S. Cl. .................... 403/19; 403/171; 403/348; 403/14
[51] Int. Cl.² ................................. F16B 17/18
[58] Field of Search .......... 403/348, 349, 254, 255, 403/264, 252, 260, 171, 172, 176, 21, 22, 14, 19; 52/756, 758 F

[56] References Cited
UNITED STATES PATENTS

| | | | |
|---|---|---|---|
| 2,465,548 | 3/1949 | Michael | 151/68 |
| 3,867,048 | 2/1975 | Endzweig | 403/255 X |

FOREIGN PATENTS OR APPLICATIONS

| | | | |
|---|---|---|---|
| 6,602,663 | 9/1966 | Netherlands | 403/258 |
| 874,657 | 4/1953 | Germany | 403/171 |
| 138,240 | 11/1952 | Sweden | 403/19 |

Primary Examiner—Andrew V. Kundrat

[57] ABSTRACT

An improved connector for removably interconnecting elongate structural members, comprising a sleeve member adapted to be removably fitted to an end of the structural member and holding an internally threaded nut apparatus, a connector bolt one end of which is threaded in the nut apparatus and having a T-head at the other end, and a tapered cylindrical collar having a concentric bore, through which the bolt extends. The T-head is adapted to non-rotatably engage an appropriately sized aperture. Intermediate the collar and sleeve, and located about the bolt, is a bias spring which biases the collar towards the T-head to hold the bolt in engaging relation with the aperture in which the T-head is inserted. The connection between the aperture and bolt may be secured by rotating the nut apparatus in a predetermined direction. A hollow connector ball, having a plurality of apertures adapted to receive and be engaged by the T-head of the bolt, is also provided to allow the structural members to be interconnected at various angles.

12 Claims, 7 Drawing Figures

U.S. Patent  Sept. 28, 1976  3,982,841
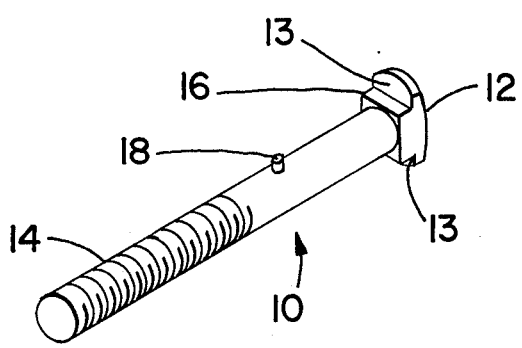
FIG_1
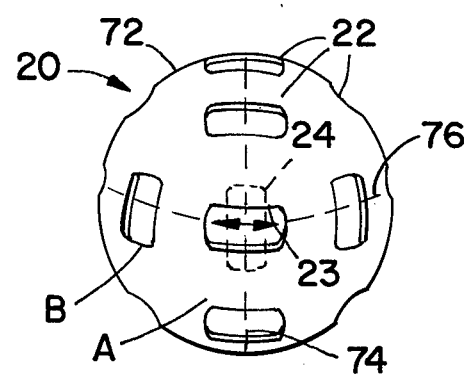
FIG_2
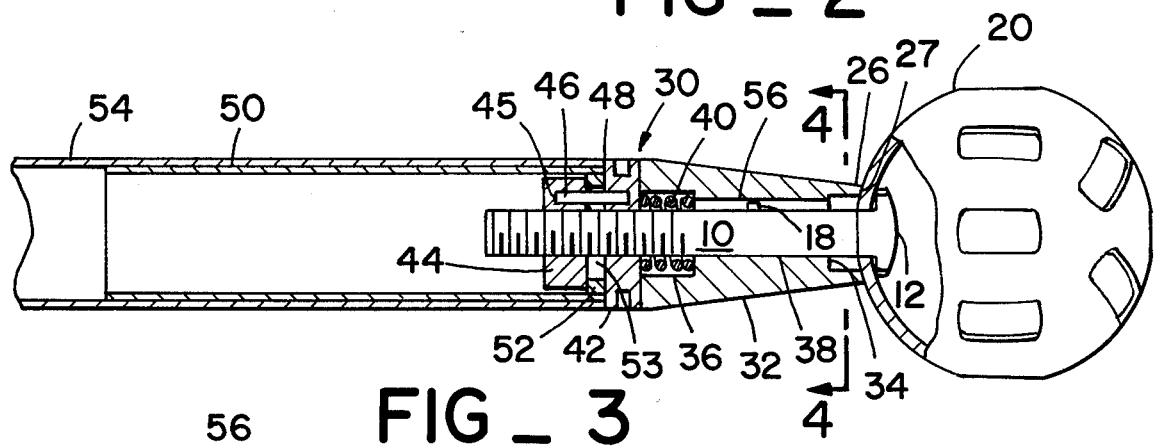
FIG_3
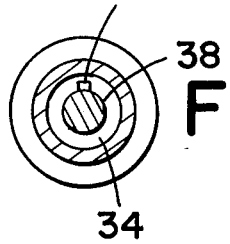
FIG_4
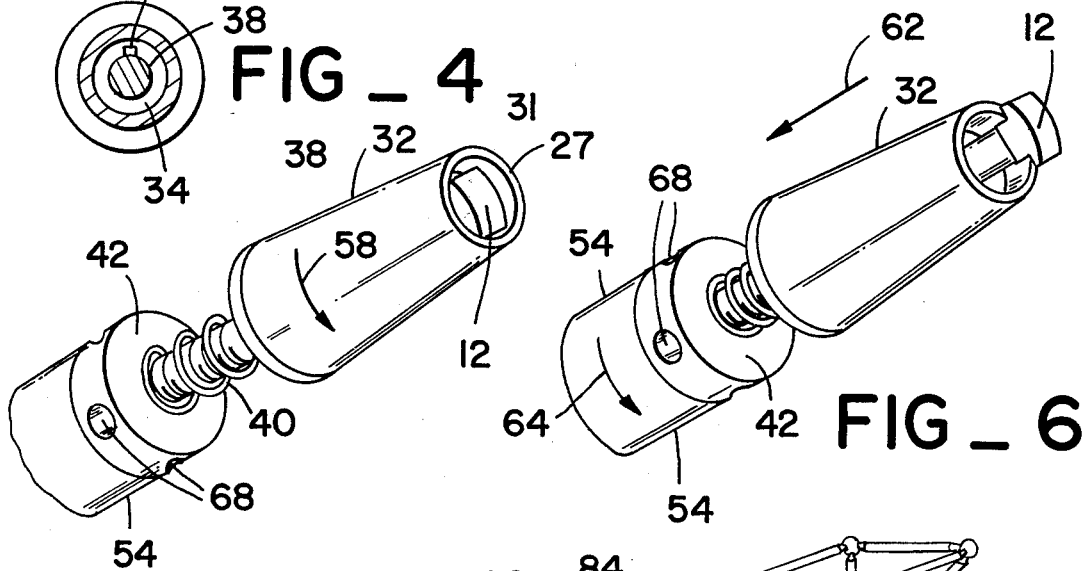
FIG_5  FIG_6
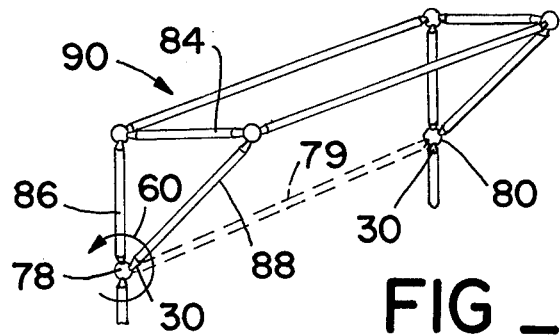
FIG_7

CONNECTING APPARATUS FOR FRAME MEMBERS

BACKGROUND OF THE INVENTION

1. Field of the Invention

This invention relates generally to frame connectors for interconnecting elongate frame members and more particularly to a frame connector for releasably securing such frame members.

2. Description of the Prior Art

Often, particularly in the construction of free-standing frame members, building members are needed which are required to be readily assembled and dismantled. Moreover, such frame members are required to be capable of providing a durable and stable structure, easy to handle, and provide for assembly and disassembly by as few persons as possible. There are a number of mechanical connections to releasably interconnect frame members utilizing screw connections or various types of quick couplers, as they are termed. Unfortunately, many drawbacks are associated with the use of these known devices.

For example, some connectors for frame members are manufactured as a part of the frame member itself or are fixed within the end of the frame member during manufacture. The length of the frame members, therefore, must be carefully determined during manufacture which, in turn, adds to the expense of manufacture. Further, use of such frame members already cut to specific length hampers imagination in construction of free-standing structures.

Moreover, due to the particular construction of the connectors used on certain frame members, more than one person is required to assemble or disassemble a structure.

Many connectors for joining frame members have the further limitation of being capable of providing only right-angle connections. My recently issued U.S. Pat No. 3,867,048 entitled, "Plug Connetions For Vertically Abutting Frame Sections" overcame this limitation to a great degree by disclosing an apertured hollow shere usable in connecting frame members at angles other than 90°. However, the method of connection disclosed in my prior patent required the threaded cross wall to be fixedly attached to the ends of the frame member. Thus, the frame members must be manufactured in fixed lengths. Moreover, if both ends of the frame member were to be connected, right-handed threads on the connector bolt of one end and left-handed threads on the connector bolt of the opposite end were required so that rotation of the frame member caused both ends to tighten simultaneously. This procedure proved not entirely satisfactory, in that one end of the frame member would become tightened before the other end if the connector bolts were not properly set up before the frame member was inserted for tightening.

BRIEF SUMMARY OF THE INVENTION

The present invention is an improvement over the plug connection disclosed in my above-identified patent. Acccording to the present invention, therefore, there is provided a connector that is removably attached to an end of an elongate structural member and adapted to engage an appropriately sized aperture located in a second member. The connector may be independently tightened to provide a secure connection between the frame member and the second member.

According to the preferred embodiment, a connector is provided that is adapted to be removably inserted into the end of an elongate, tubular frame member. The connector comprises a sleeve which holds a rotatable tightening nut into which a T-head bolt is threaded. The sleeve is adapted to be removably inserted into the end of the frame member. A cylindrical, tapered collar, with an axial through bore for receiving the bolt, is situated intermediate the T-head of the bolt and the sleeve. A biasing spring is mounted about the bolt between the collar and sleeve to bias the collar towards the T-head of the bolt.

The T-head of the bolt is rectangular in nature and adapted to be received by, and engage, a generally rectangular aperture. Such an aperture may be situated in any second member, such as another frame member or a wall section, thereby providing an interconnection between the second member and the frame member containing the connector. However, in the preferred embodiment, a connector ball is provided comprising a hollow sphere or ball with a plurality of generally rectangular apertures located thereon, adapted to receive the T-head of the bolt of the connector.

The T-head of the bolt has, at the junction of the T-head and bolt shaft, a substantially rectangular key section. The T-head of the bolt is inserted into one of the apertures of the connector ball and turned approximately 90° to cause a holding engagement between the bolt and the connector ball. The holding collar is biased towards the T-head by the spring causing the bolt to be temporarily held in the aperture. Rotating the tightening nut causes the bolt to be drawn into the sleeve which, in turn, pulls the frame member and connector ball towards each other. With the threaded end of the bolt drawn within the sleeve, the holding collar is securely held between the frame member and connector ball to effect a rigid connection. The same process may be repeated to attach other members to the same connector ball to permit various angled connections, depending upon the placement of the T-heads in the apertures of the connector ball.

A number of advantages are reealized by the invention as described. Since the connector apparatus can be removably inserted into the frame member or strut, the member may be cut to size at the location of construction. There is no requirement that the frame members be manufactured in specific lengths. If the frame member is to be subjected to tension forces, the sleeve may be adapted to be friction-fitted into the end of the frame member or otherwise secured thereto.

Moreover, the particular connector apparatus disclosed herein will allow construction by one person only. This advantage is achieved when the T-head bolt properly engages an aperture and the holding collar is biased to hold the bolt seated in the aperture. The connection need not be held together by one person while another person continues construction or tightens certain connections.

Use of the connecting apparatus of the present invention with an appropriately apertured connector ball allows frame members to be joined at various angles. Connections are not limited to right angles only.

Further, since the connecting apparatus is meant to be removably fitted to the end of a frame member, rather than manufactured as a part of the frame member, a variety of elements may be used. Thus, rather than the metal tubing disclosed in the preferred embodiment, frame members of plastic, wood or wood spindles can be manufactured and adapted to receive the connecting apparatus of this invention.

For a better understanding of the present invention, together with other and further features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is a perspective view of the T-head connector bolt for use with the present invention;

FIG. 2 shows a connector ball for use in the present invention;

FIG. 3 is a cross sectional view of the connecting apparatus of the present invention illustrating connection between a connector ball and a structural member;

FIG. 4 is a cross section along line 4—4 of FIG. 3;

FIGS. 5 and 6 illustrate concealment of the T-head of the bolt within a recess of the holding collar and exposing the T-head of the bolt in preparation for engagement with an aperture, respectively; and FIG. 7 illustrates a perspective view of a free-standing shelf utilizing connectors as disclosed herein.

DETAILED DESCRIPTION OF THE PREFERRED EMBODIMENT

Referring now to FIG. 1, there is shown threaded connector bolt 10 for use with the present invention. Located at one end of connector bolt 10 is T-head 12 with rectangular key 16 located immediately beneath T-head 12. Located at the other end of connector bolt 10 is threaded end 14. Intermediate T-head 12 and threaded end 14 is projection 18 substantially perpendicular to bolt 10.

T-head 12 of connector bolt 10 is adapted to releasably engage an aperture having dimensions substantially rectangular in shape. Preferably, such an aperture should be sufficiently sized to allow the T-head to be inserted, rotated 90°, thereby causing key 16 to become non-rotatably seated in the aperture with flanges 13, 13 of the T-head holding the bolt 10 to the aperture. Thus, and as shown in FIG. 2, connector ball 20 is provided with appropriately sized apertures 22. Connector ball 20 is a hollow sphere of metal or the like having apertures 22 cut therein. In the preferred embodiment apertures 22 are arranged upon connector ball 20 in an order following circumferential circles 72, 74 and 76. As shown in FIG. 2, circumferential circle 72 lies in the plane of the drawing. Groups of eight such apertures are equally spaced apart in circular arrangements 72, 74 and 76 such that the angular disposition between two apertures along any one circle is 45°. Moreover, appropriate placement of one circular arrangement of apertures 22 with respect to a second circular arrangement can obtain additional angular divisions. Thus, each circular arrangement of apertures 22 are situated so that the angular disposition between aperture A, located on circular arrangement 74 and aperture B, on circular arrangement 76, is 60°. It can be seen, therefore, that angular connections of 45°, 60°, or multiples thereof may be easily achieved.

Apertures 22 are appropriately dimensioned to receive T-head 12 of connector bolt 10. Bolt 10 is provided with rectangular key 16 such that when T-head 12 of bolt 10 is inserted in aperture 22, rotated on its longitudinal axis approximately 90 degrees, key 16 will fit in aperture 22 to become seated therein. While so seated, rotation of bolt 10 is inhibited. Moreover, as shown by broken line 24, bolt 10 is engageably held to the inside wall of hollow connector ball 20.

Additionally, with bolt 10 seated in aperture 22 (as indicated by dotted lines 24) it is to be noted that a certain amount of side slip tolerance is allowed. Bolt 10 can, when seated in aperature 22, be slidably moved from side to side a slight amount as indicated by arrow 23. This side slip allows slight overtolerances, which can develop during construction, to be compensated for before connector 30 is tightened.

Referring now to FIG. 3, there is shown connector 30 used to join elongate, tubular structural member 54 to connector ball 20.

As shown, connector 30 comprises tubular sleeve 50, holding and tightening nuts 44 and 42, respectively, into which bolt 10 is threaded, and holding collar 32. Sleeve 50 has, fixedly attached interior thereof at end 48, retaining ring 52. Positioned either side of retaining ring 52 is tightening nut 42 and holding nut 44. When bolt 10 is threaded into and through nuts 42 and 44, it can be seen that both nuts, in cooperation with retaining ring 52, act to couple bolt 10 to sleeve 50.

Pin 46 is seated in locking nut 42, and extends therefrom to protrude through opening 53 of retaining ring 52. Nut 44 is provided with aperture 45 to receive pin 46. With both nuts 42 and 44 threaded on bolt 10 and with pin 46 extending from nut 42 into aperture 45 in nut 44, both nuts are coupled together and held in a spaced-apart relation. Thus, rotation of tightening nut 42 will cause rotation of nut 44 which, in turn, will cause bolt 10 to be drawn into or extended out of, sleeve 50. Further, simultaneous rotation of nuts 42 and 44 insures that the separation of the two nuts will be retained so long as the nuts remain threaded on bolt 10.

Both nuts 42 and 44 are disc-shaped. Holding nut 44 has an outer diameter larger than opening 53 of retaining ring 52 but a diameter less than sleeve 50 so that nut 44 will be allowed to rotate therein. Preferably, the outer diameter of tightening nut 42 will be the same as that of tubular structural member 54.

Located about the periphery of tightening nut 42 are four radial holes 68 positioned approximately 90° from each other (FIGS. 5 and 6). Radial holes 68 are provided to facilitate rotation of tightening nut 42 and may be adapted to accept a tool, such as a spanner wrench or the like.

Bolt 10 extends through collar 32 which is situated intermediate tightening nut 42 and T-head 12. Referring to FIGS. 3 and 4, collar 32 is shown with a frustro-conical outer surface with a concentric bore 38 extending therethrough. Concentric bore 38 has channel 56 adjacent thereto and in axial alignment therewith. Channel 56 is provided to slidably receive projection 18 on bolt 10. With projection 18 so situated in channel 56 of collar 32, rotation of the collar will similarly cause bolt 10 to also rotate.

Disposed about bolt 10, between collar 32 and sleeve 50, is bias spring 40. Spring 40 acts to bias collar 32 away from sleeve 50 and towards T-head 12 of bolt 10. The smaller end 26 of collar 32 is provided with recess 34 adapted to receive T-head 12. When connecting apparatus is tightened by rotation of tightening nut 42, connector bolt 10 is drawn into insert 50. This, in turn, draws collar 50 against tightening nut 42. Thus, to facilitate a secure interface between collar 32 and tightening nut 42, when so tightened, recess 36 is provided to receive compressed bias spring 40. The tip 27 of the narrow end of collar 32 is somewhat spherical in shape to facilitate engagement between the collar and connector ball 20.

Collar 32 is also provided with mark 31 (FIG. 5) of the narrow end of the collar to indicate the lengthwise direction of T-head 12. The utilization of mark 31 will be elaborated on more fully below.

Referring now to FIGS. 3, 5 and 6, operation and use of connecting 30 may now be described. Initially, connector 30 is assembled as shown in FIG. 3 but without connector ball 20. Locking nut 42 and holding nut 44 are held in spaced relation on either side of retaining ring 52 essentially by being threaded upon bolt 10. Connector sleeve 50 is slidably inserted into structural member 54. If structural member 54 is to experience tension, connector insert 50 may be force-fitted, swaged, or the like to provide sufficient coupling between connector 30 and structural member 54.

As shown in FIG. 5, collar 32 is normally biased towards T-head 12 of bolt 10 by bias spring 40. This causes T-head 12 to be received by, and situated within, recess 34 of collar 32. Collar 32 may be rotated in the direction of arrow 58 (FIG. 5), while nut 42 is held non-rotatable, to extend bolt 10 and the collar out of insert 50 and structural member 54.

T-head 12 is then exposed for connection with connector ball 20 by axially disposing collar 32 towards structural member 54 (as indicated by arrow 62 of FIG. 6). Exposed, T-head 12 can now be inserted into aperture 22 of connector ball 20. Bolt 10 is then rotated, by rotating collar 32, 90° to cause the T-head to engage the interior of the connector ball and key 16 to seat in aperture 22 for a non-rotatable connection therewith. When released, spring 40 will then bias collar 32 against connector ball 20 to hold key 16 of bolt 10 seated in aperture 22 until the connector apparatus is tightened.

The connection between structural member 54 and connector ball 20 may now be tightened in a number of ways. For example, the frame member itself may be rotated in the direction indicated by arrow 64 (FIG. 6). This will cause bolt 10 to be drawn into sleeve 50 thereby pulling connector ball 20 and frame member 54 towards each other, sandwiching collar 32 therebetween. However, if structural member 54 is connected at its opposite end, it can be seen that rotating the member to tighten one end will loosen the connection at the opposite end. In such a case, therefore, it is preferable that connecting apparatus 30 is tightened by rotating tightening nut 42 in the direction of arrow 64. It will be remembered that rotation of nut 42 is transmitted to nut 44 by pin 46 which couples the two nuts together (FIG. 3). Rotation in the direction of arrow 64 will cause bolt 10 to be drawn into insert 50 and structural member 54. This draws the bolt 10-connector ball 20 connection towards structural member 54 until collar 32 is firmly held between the connector ball and nut 42 (FIG. 3). T-head 12 is now firmly held in aperture 22 and, in turn, tightly joins connector ball 20 to structural member 54.

For dismantling, tightening nut 42 is rotated in direction opposite arrow 64. This causes bolt 10 to be extended. Rotation of nut 42 is continued until there is a sufficient length of bolt 10 extended into connector ball 20 so that key 16 is sufficiently clear of aperture 22 to allow rotation of bolt 10. Bolt 10 is then rotated approximately 90° to align T-head 12 with aperture 22 for withdrawing bolt 10 therefrom.

Referring now to FIG. 7, wherein there is shown a partial free-standing structure 90 using a number of the connectors according to the present invention, particular aspects and advantages of the present invention can now be more clearly understood. First, assume that with the unit partially assembled, connector balls 78 and 80 are a fixed distance apart. Member 79 (indicated by broken lines), having connectors 30, 30 at each end thereof, is desired to be inserted between connector balls 78 and 80. It may be seen that if bolt 10 is initially extended, the distance between connector balls 78 and 80 must be lengthened. However, according to the present invention insertion of member 79 may be effected without immediately extending bolt 10. This is accomplished by initially having the connector tightened as shown in FIG. 3 (but without connector ball 20) so that T-head 12 is within recess 34 of collar 32. With connector 30 at both ends of member 79 in this condition, member 79 may then be inserted between connector balls 78 and 80. Using mark 31, located at the narrow end of collar 32, the T-head 12 of connector 30 is aligned with an appropriate aperture 22 of connector ball 78. Tightening nut 42 (FIG. 3) is then rotated in the direction of arrow 60 (FIG. 7) to cause bolt 10 to extend through aperture 22 and into connector ball 78. Collar 32 may then be rotated approximately 90° to allow key 16 to engage the aperture when bolt 10 is drawn back into connector 30. Connector 30, at the end of member 79, is then tightened by rotation of the tightening nut to cause bolt 10 to be drawn back into member 79 and key 16 to appropriately seat in aperture 22 of connector ball 78. The same procedure may then be followed to connect the opposite end of member 79 to connector ball 80.

Alternaately, this connecting procedure may be reversed to remove member 79 from structure 90.

The taper of holding collar 32 allows for a number of connections to a single connector ball 20 without crowding. Additionally, because of the extended amount of axial travel provided bolt 10, connector ball 20 may be made of varied thicknesses depending upon the strength required.

It is evident, therefore, that the subject invention provides a convenient and simple apparatus for connecting structural members, particularly structural members that are tubular in nature, in assembling a free-standing structure or the like.

Although the foregoing invention has been described in some detail by way of illustration and example for purposes of clarity of understanding, it will be obvious that certain changes and modifications may be practiced within the scope of the appended claims. For example, while the preferred embodiment disclosed a connector having a sleeve adapted to be inserted into a tubular frame member, the connector could be provided with a sleeve that would fit over such frame members as wood spindles or the like. Accordingly, the intent is to embrace all such alternatives, modifications, and variations as fall within the spirit and broad scope of the appended claims.

I claim:

1. An improved frame connector adapted to removably join an elongate frame section to a second member comprising:

sleeve means adapted to be disengageably connected to an end of the frame section and having internally threaded means rotatably held captive therein;

a collar having a through bore axially disposed therein;

threaded bolt means in the through bore and threaded in the internally threaded means, said bolt means including an enlarged head member;

said second member having an aperture adapted to removably receive the head member in engaging relation; and biasing means axially intermediate the collar and one end of the sleeve means for biasing the collar towards the head member to hold the head member in engaging relation with the aperture.

2. The improved frame connector of claim 1, wherein the collar includes:

a recess in one end thereof sized to allow said head member to be substantially disposed within said recess.

3. The improved frame connector of claim 2, and including:

a projection situated on said threaded bolt means; and slot means in said through bore for slidably receiving said projection.

4. The improved frame connector of claim 3, and including:

means on an outer periphery of the internally threaded means for receiving a tool to facilitate rotation thereof.

5. An improved frame connecting apparatus for use in interconnecting a number of elongate tubular structural members, comprising:

intermediate connecting means having a plurality of substantially rectangular apertures of predetermined dimensions;

sleeve means adapted to be disengageably connected to an end of a structural member and having an internally threaded means rotatably held captive therein;

a cylindrical collar having a through bore axially disposed therein;

threaded bolt means slidably situated in the through bore of the collar and threaded in the internally threaded means, said bolt means including a rectangular head member adapted to removably engage an aperture of the intermediate connecting means; and biasing means axially intermediate the collar and one end of the sleeve means for biasing the collar towards the head member so that the head member is held in engaging relation with the intermediate connecting means when the head member is inserted therein.

6. The improved frame connecting apparatus of claim 5, wherein said collar includes:

an outer frustro-conical surface terminating in an end having a first recess therein, said recess adapted to receive the head member.

7. The improved frame connecting apparatus of claim 6, and including:

a projection affixed upon the bolt means and extending perpendicular thereto, said projection disposed between the head member and the opposite end of the bolt means; and slot means adjacent the through bore of the collar and in axial alignment therewith for slidably receiving the projection.

8. The improved connector of claim 5, wherein the internally threaded means includes means disposed about the outer periphery thereof for accepting a tool to facilitate rotation.

9. The improved frame connecting apparatus of claim 6, wherein the biasing means comprises:

a helical spring disposed about the bolt means.

10. The improved frame connecting apparatus of claim 9, wherein the collar includes:

a second recess disposed at an end opposite the first recess for receiving the helical spring such that when the internally threaded means is rotated the bolt means is drawn into the sleeve means and the spring is compressed into the second recess.

11. The improved frame connecting apparatus of claim 5, and wherein said intermediate connecting means comprises:

a hollow cylindrical ball.

12. The improved frame connecting apparatus of claim 11, and wherein said apertures have angular dispositions of 45°, 60°, and 90°.

* * * * *